(12) United States Patent
Miyasato et al.

(10) Patent No.: US 9,366,306 B2
(45) Date of Patent: Jun. 14, 2016

(54) DOUBLE-ROD TYPE SHOCK ABSORBER

(71) Applicant: SMC CORPORATION, Chiyoda-ku (JP)

(72) Inventors: Eiko Miyasato, Moriya (JP); Youji Takakuwa, Kitakatsushika-gun (JP); Akira Hiroki, Adachi-ku (JP); Kouichi Matsuzaki, Tsukuba (JP); Toshio Minakuchi, Abiko (JP); Kodai Yoshinaga, Kashiwa (JP); Tsuyoshi Mita, Moriya (JP); Mariko Kessoku, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/409,571

(22) PCT Filed: May 29, 2013

(86) PCT No.: PCT/JP2013/064887
§ 371 (c)(1),
(2) Date: Dec. 19, 2014

(87) PCT Pub. No.: WO2013/190961
PCT Pub. Date: Dec. 27, 2013

(65) Prior Publication Data
US 2015/0198212 A1   Jul. 16, 2015

(30) Foreign Application Priority Data

Jun. 21, 2012   (JP) ................................ 2012-140089

(51) Int. Cl.
*F16F 9/20* (2006.01)
*F16F 9/48* (2006.01)
*F16F 9/30* (2006.01)

(52) U.S. Cl.
CPC . *F16F 9/20* (2013.01); *F16F 9/303* (2013.01); *F16F 9/483* (2013.01)

(58) Field of Classification Search
CPC ......... F16F 9/152; F16F 9/348; F16F 9/3488; F16F 9/20

USPC ........... 188/280, 282.4, 282.5, 312, 288, 304, 188/316
See application file for complete search history.

(56) References Cited

U.S. PATENT DOCUMENTS

| 404,012 | A | * | 5/1889 | Nickerson | ................. B66B 1/04 187/311 |
| 625,454 | A | * | 5/1899 | Maxim | ........................... 105/61 |

(Continued)

FOREIGN PATENT DOCUMENTS

| JP | 52-15965 | 2/1977 |
| JP | 61-189335 | 8/1986 |

(Continued)

OTHER PUBLICATIONS

International Search Report issued Jul. 30, 2013, in PCT/JP2013/064887, filed May 29, 2013.

(Continued)

*Primary Examiner* — Melanie Torres Williams
(74) *Attorney, Agent, or Firm* — Oblon, McClelland, Maier & Neustadt, L.L.P.

(57) ABSTRACT

A double-rod type shock absorber includes a rod, first and second pistons held by the rod, first and second piston chambers disposed on an outer side of the first and second pistons, a liquid storage chamber between the first piston and the second piston, a flow path gap formed between an outer peripheral surface of the first and second pistons and an inner peripheral surface of the liquid chamber, and first and second unidirectional flow paths which connect the first and second piston chambers with the liquid storage chamber, wherein, during reciprocating motion of the rod, the unidirectional flow path located on a front side in a movement direction of the rod is closed, and the unidirectional flow path located on a back side in the movement direction of the rod is opened.

13 Claims, 3 Drawing Sheets

(56) References Cited

U.S. PATENT DOCUMENTS

| | | | | |
|---|---|---|---|---|
| 1,273,059 A | * | 7/1918 | Hild | F16F 9/20 |
| | | | | 188/312 |
| 1,845,165 A | * | 2/1932 | McGrew | F16F 9/48 |
| | | | | 188/288 |
| 1,845,166 A | * | 2/1932 | McGrew | F16F 9/26 |
| | | | | 188/288 |
| 1,876,146 A | * | 9/1932 | McGrew | F16F 9/26 |
| | | | | 188/288 |
| 2,088,875 A | * | 8/1937 | Serste | F16F 9/145 |
| | | | | 188/281 |
| 5,829,556 A | * | 11/1998 | Domange | E04H 9/021 |
| | | | | 188/268 |
| 8,857,583 B2 | | 10/2014 | Miyasato et al. | |

FOREIGN PATENT DOCUMENTS

| | | |
|---|---|---|
| JP | 2000-291715 | 10/2000 |
| JP | 2007-16881 | 1/2007 |
| JP | 2010-7765 | 1/2010 |
| JP | 2011-144875 | 7/2011 |

OTHER PUBLICATIONS

U.S. Appl. No. 14/409,680, filed Dec. 19, 2014, Miyasato, et al.

* cited by examiner

DOUBLE-ROD TYPE SHOCK ABSORBER

TECHNICAL FIELD

The present invention relates to a double-rod type hydraulic shock absorber for reciprocating moving objects which is configured to stop a reciprocating motion of the moving object in either direction in a shock-absorbing manner.

BACKGROUND ART

As disclosed in PTL 1 and PTL 2, in a commonly known hydraulic shock absorber, a liquid chamber in a cylinder housing is filled with oil such as mineral oil, and a piston for braking is housed in the liquid chamber while leaving a flow path gap for the oil around the piston, and a rod connected with the piston extends to the outside from one end of the cylinder housing. When a moving object collides with the distal end of the rod and the piston is displaced, a kinetic energy of the moving object is absorbed by a flow resistance of the oil flowing through the flow path gap.

In the shock absorber having such a known configuration, the rod connected with the piston extends from one end of the cylinder housing so that the moving object which collides with the distal end of the rod is stopped in a shock-absorbing manner. However, when the moving object moves in a reciprocating motion, a pair of shock absorbers oppositely oriented in the movement direction of the moving object needs to be provided in order to stop the reciprocating motion in either direction in a shock-absorbing manner. Further, in a case where the moving object to be stopped in a shock-absorbing manner is, for example, driven to reciprocated by a hydraulic pressure driving device, it is necessary to ensure an installation space for a pair of shock absorbers on or around the hydraulic pressure driving device. Accordingly, the configuration of the hydraulic pressure driving device may be complicated or installation of the pair of shock absorbers may be restricted.

In order to solve the above problem, for example, PTL 3 discloses a buffer (shock absorber) which includes a pair of independent piston rods with one end of each extending from each end of the cylinder in the axis direction of the cylinder.

The buffer disclosed in PTL 3 is practically configured by combining two oppositely oriented buffers having a single piston rod. Since a fluid urged by the piston in both buffers is guided to a separately provided contracting section which has a flow path having an adjustable cross sectional area without being guided to the back side of the piston through a gap around the piston as described in PTL 1, a flow path resistance is independently adjustable in each buffer. Accordingly, a flow path that allows the fluid to flow to the back side of the piston where a negative pressure is generated by movement of the piston in the cylinder is separately formed so that a braking force by each piston rod is independently variable. As a consequence, the flow path for a fluid such as oil that applies a flow resistance to a pair of pistons of the buffer is extremely complicated and is not easy to manufacture, which makes it difficult to stably perform a shock-absorbing function for a long period of time.

Further, in the buffer which is configured to stop the reciprocating motion of the moving object in either direction in a shock-absorbing manner, the moving object collides with the end of one of the piston rods and is stopped in a shock-absorbing manner, and then the moving object collides with the end of the other of the piston rods. Accordingly, when the moving object collides with the end of one of the piston rods, the end of the other of the piston rod needs to be returned to an extended position (return position). However, in a case where a pair of piston rods extending from each end of the cylinder is independent from each other and the other of the piston rods is moved to the return position by a fluid such as oil sealed in the buffer as disclosed in PTL 3, the other of the piston rods may not return to the appropriate return position when the moving object collides with one of the piston rods, due to leakage of a fluid, flow problem of the fluid in a part of the flow path or any other reasons. As a result, an initial shock-absorbing function cannot be performed.

Further, as described above, in a configuration formed by two buffers combined with each other in which braking forces of two piston rods are independent and variable, it is relatively difficult to provide a structure commonly used by the two buffers. In addition to that, since the flow resistances of the fluid urged by the pistons are independently adjustable as described above, the flow path for the fluid such as oil that applies a flow resistance is extremely complicated and a large number of flow paths is necessary. As a result, the overall configuration increases in size and at least size reduction is difficult.

CITATION LIST

Patent Literature

PTL 1: Japanese Unexamined Patent Application Publication No. 2011-144875

PTL 2: Japanese Unexamined Patent Application Publication No. 2010-7765

PTL 3: Japanese Unexamined Patent Application Publication No. 61-189335

SUMMARY OF INVENTION

Technical Problem

The technical object of the present invention is to provide a double-rod type hydraulic shock absorber having a rational and simple design configuration for stopping a reciprocating motion of the moving object in either of the movement directions in the reciprocation in a shock-absorbing manner.

Another technical object of the present invention is to provide a double-rod type hydraulic shock absorber which includes a series of rods that extends from each end of the cylinder housing to the outside so that the moving object collides with the rods and is configured such that, when the moving object collides with one end of the rod and the rod moves and then stops in a shock-absorbing manner, the other end of the rod is pushed back to an appropriate return position on the other end of the cylinder housing while the liquid which is pressurized by the piston for braking flows in a direction opposite to the movement of the rod and is ready for a next collision by the moving object to the other end of the rod. This results in the double-rod type hydraulic shock absorber which can stably perform a shock-absorbing function to a reciprocating motion of the moving object in either direction with a simple mechanism.

Solution to Problem

In order to solve the above problem, a double-rod type shock absorber according to the present invention includes cylinder housing in which a liquid chamber filled with a liquid is formed; a series of rods that penetrates the cylinder housing in an axis direction with one end and the other end extending to an outside from one end and the other of the cylinder housing in a liquid-tight manner and reciprocates in the axis direction; first and second pistons that are held with a space interposed therebetween in the axis direction at a position in the liquid chamber of the rod; first and second piston chambers that are defined by the first and second pistons on one end and the other end of the liquid chamber; a liquid storage chamber that is formed between the first piston and the second piston; a flow path gap that is formed between an outer peripheral surface of the first and second pistons and an inner peripheral surface of the liquid chamber so that a flow resistance is applied to the liquid; and first and second unidirectional flow paths which are openable/closable and connect the first and second piston chambers with the liquid storage chamber, wherein the first and second unidirectional flow paths are configured such that, during reciprocating motion of the rod, the unidirectional flow path located on a front side in a movement direction of the rod is closed so as not to allow the liquid to flow from the piston chamber located on the front side in the movement direction to the liquid storage chamber, and the unidirectional flow path located on a back side in the movement direction of the rod is opened so as to allow the liquid to flow from the liquid storage chamber to the piston chamber located on the back side in the movement direction.

According to the above aspect of the invention, it is preferable that the rod includes a first rod member that extends from one end of the cylinder housing, a second rod member that extends from the other end of the cylinder housing, and an intermediate member that connects the first rod member and the second rod member in the liquid chamber, the first and second pistons are disposed to be displaceable in the axis direction on piston mounting sections which are formed on the first and second rod members at positions adjacent to the intermediate member and are displaced by reciprocating motion of the rod into contact with and away from the first and second abutment surfaces on one end and the other end of the intermediate member in an alternative manner, and the first and second unidirectional flow paths each include a communication path formed between an inner peripheral surface of the first and second pistons and an outer peripheral surface of the piston mounting sections so as to be normally in communication with the first and second piston chambers and an opening/closing path formed between the first and second abutment surfaces of the intermediate member and a side face of the first and second pistons so as to allow or block communication between the communication path and the liquid storage chamber, and the opening/closing path is configured to be opened/closed by the first and second pistons which come into contact with and move away from the first and second abutment surfaces.

Further, according to the above aspect of the invention, it is preferable that a communication groove is formed between the side face of the first and second pistons which faces to the first and second piston chambers and a step section for the pistons which come into contact with and move away from the step section disposed on an end of the piston mounting sections so that the communication path is normally in communication with the first and second piston chambers.

According to the above aspect of the invention, it is preferable that an inner diameter of the liquid chamber is maximum at a position between the first piston chamber and the second piston chamber and gradually decreases toward the first piston chamber and the second piston chamber. The inner diameter of the liquid chamber may be different in each of the first piston chamber and the second piston chamber.

Further, according to the above aspect of the invention, it is preferable that a portion of the first and second rod members which reciprocates in the liquid chamber, the intermediate member, the first and second pistons and the first and second unidirectional flow paths are symmetry with respect to a center of the intermediate member in the axis direction.

According to the above aspect of the invention, an elastic member formed of an expandable and contractible foam having closed cells may be housed in the liquid storage chamber so as to form an accumulator by applying pressure to the liquid and compressing the elastic member.

Further, a filling hole for filling the liquid may be formed at a center of the liquid chamber in the cylinder housing, and the filling hole may be closed by a pressure adjusting plug which applies pressure to the liquid.

The double-rod type shock absorber having the above configuration includes the series of rods which penetrates the liquid chamber and holds a pair of pistons, and is configured such that, when the moving object collides with one end and the other end of the rod in an alternative manner and the rod reciprocates, the liquid in the piston chamber pressurized by one of the pistons flows into the liquid storage chamber through the flow path gap around the pressurizing piston, and flows out of the liquid storage chamber into the piston chamber defined by the other of the pistons through the unidirectional flow path on the other of the pistons. When the rod moves in one direction by collision of the moving object and stops at a movement end in a shock-absorbing manner, the other end of the rod is pushed back to a return position extending from the other end of the cylinder housing while the liquid which is pressurized by the piston for braking flows in the liquid chamber in a direction opposite to the movement direction of the rod and is ready for a next collision by the moving object to the other end of the rod.

Accordingly, each time the moving object collides with the rod members on both ends of the cylinder housing, a simple operation in which a substantial part of the liquid in the one of the piston chambers flows into the other of the piston chambers is repeated. This is similar to the conventional flow of liquid in the hydraulic shock absorber having the rod extending from only one end of the cylinder housing (see PTL 1), and accordingly, a known technique can be fully utilized and components of the shock absorber can be used in common.

Therefore, it is possible to achieve the double-rod type hydraulic shock absorber which can stably perform a shock-absorbing function to a reciprocating motion of the moving object in either direction with reduced number of components, simplified configuration and reduced cost.

Advantageous Effects of Invention

As described above, according to the present invention, it is possible to achieve the double-rod type hydraulic shock absorber having a rational and simple design configuration for stopping a reciprocating motion of the moving object in either of the movement directions in the reciprocation in a shock-absorbing manner.

DESCRIPTION OF EMBODIMENTS

Figure 1:
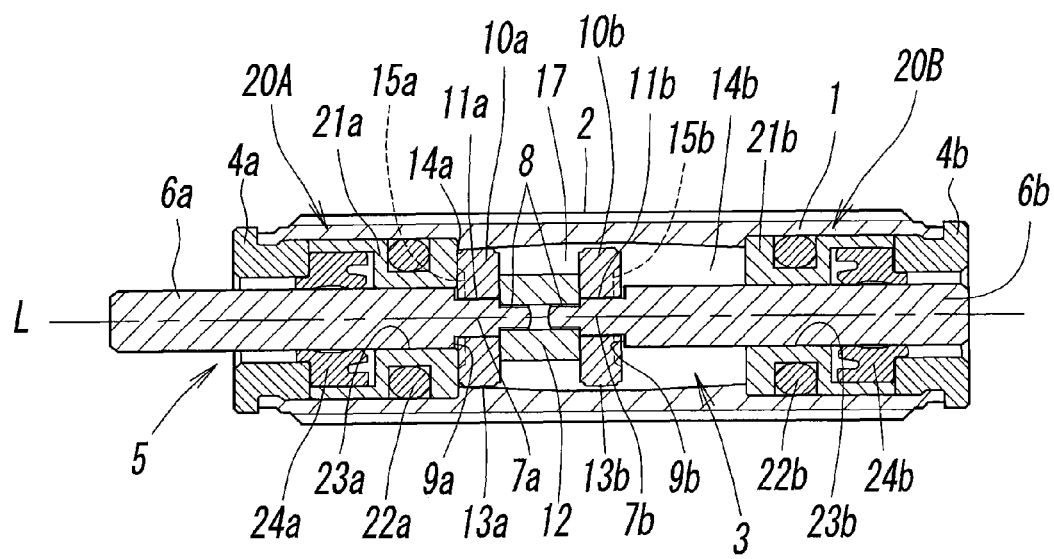
FIG. 1 is a vertical sectional view which shows a configuration of a first embodiment of a double-rod type shock absorber according to the present invention.
Figure 2:
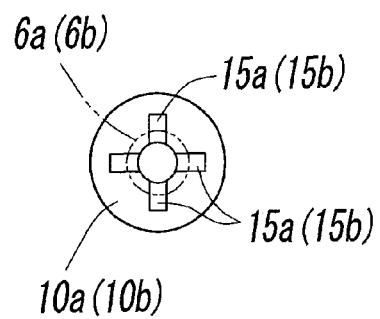
FIG. 2 is a front view of a piston of the first embodiment.

FIGS. 1 through 4 show a first embodiment having a basic configuration of a double-rod type shock absorber according to the present invention. The double-rod type shock absorber is a device for reciprocating moving objects which is configured to stop a reciprocating motion of the moving object in either direction in a shock-absorbing manner. Generally, the double-rod type shock absorber is mounted on an actuator that reciprocates the moving object by means of a force such as hydraulic pressure or on a device to be reciprocated by the actuator, but not limited thereto.

The double-rod type shock absorber includes a cylinder housing 1 in which a single cylindrical (circular hole-shaped) liquid chamber 3 which is filled with a liquid such as oil is formed. One end of the liquid chamber 3 in an axial line L direction is closed by a first seal mechanism 20A and a first cover 4a, while the other end of the liquid chamber 3 in an axial line L direction is closed by a second seal mechanism 20B and a second cover 4b. On one end of the cylinder housing 1, a distal end of a first rod member 6a formed in a cylindrical shape extends to the outside in a liquid-tight manner through center holes of the first seal mechanism 20A and the first cover 4a. On the other end of the cylinder housing 1, a distal end of a second rod member 6b extends to the outside in a liquid-tight manner through center holes of the second seal mechanism 20B and the second cover 4b. The distal ends of the rod members 6a, 6b alternatively abut the reciprocating moving object so as to stop the moving object in a shock-absorbing manner.

The cylinder housing 1 has a spiral groove 2 on its periphery to mount the shock absorber at a necessary position on the actuator that reciprocates the moving object. However, the cylinder housing 1 may be mounted at a necessary position on the actuator or the like by any means. For example, the spiral groove is not provided in a third embodiment shown in FIG. 6 and the cylinder housing 1 is fixed at a necessary position by any other means.

The first and second rod members 6a, 6b are mechanically connected to each other in a configuration which will be described later and provided as one connecting rod 5. Accordingly, the connecting rod 5 penetrates the liquid chamber 3 in the cylinder housing 1 in an axial line L direction, and one end and the other end of the connecting rod 5 extend to the outside from the first seal mechanism 20A and the first cover 4a, and the second seal mechanism 20B and the second cover 4b, respectively, on each end of the liquid chamber 3. A length of the one connecting rod 5 is defined such that, when the moving object collides with either of one end or the other end of the connecting rod 5, that is, either of the distal end of the first rod member 6a or the distal end of the second rod member 6b, and the collided rod member is urged into a stop position in the cylinder housing 1, the distal end of the other of the rod members extends from a cover of the liquid chamber 3 to a necessary extended position (return position) and is ready for a next collision by the moving object.

In the following description, the aforementioned connecting rod is simply referred to as a rod.

The rod 5 is formed by connecting the proximal ends of the first and second rod members 6a, 6b, which have distal ends extending from the covers 4a, 4b on each end of the liquid chamber 3, respectively. The proximal ends of the first and second rod members 6a, 6b are connected by a cylindrical intermediate member 12 in the liquid chamber 3 with first and second pistons 10a, 10b of an annular shape that are movable in the axial line L direction interposed therebetween.

Figure 4:
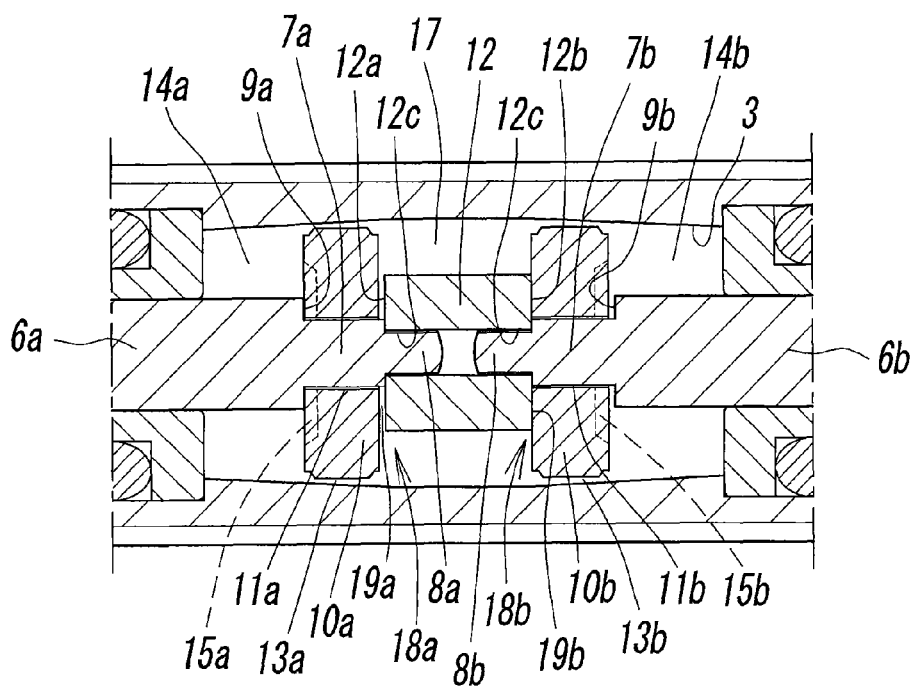
FIG. 4 is an enlarged view of an essential part of FIG. 3.

More specifically, as seen from FIG. 4, the rod members 6a, 6b include piston mounting sections 7a, 7b having a decreased diameter and connecting portions 8 having a male thread for insertion into a thread hole 12c of the intermediate member 12, which are disposed in sequence to the end connected to the intermediate member 12. The pistons 10a, 10b are slidably fitted on the piston mounting sections 7a, 7b, and then the connecting portions 8 are inserted into the thread hole 12c of the intermediate member 12 for connection. A length of the piston mounting sections 7a, 7b in the axial line L direction is slightly larger than a thickness of the pistons 10a, 10b, which allows the pistons 10a, 10b to be displaced in the axial line L direction within the dimensional difference at the piston mounting sections 7a, 7b.

A first piston chamber 14a is formed between the first piston 10a and the first seal mechanism 20A on one end of the liquid chamber 3, and a second piston chamber 14b is formed between the second piston 10b and the second seal mechanism 20B on the other end of the liquid chamber 3. Further, flow path gaps 13a, 13b are formed between the outer periphery of the first and the second pistons 10a, 10b and the inner peripheral surface of the first and second piston chambers 14a, 14b, respectively. When the liquid in the first and second piston chambers 14a, 14b is compressed by the first and second pistons 10a, 10b and flows into the liquid storage chamber 17 on the back side of the pistons 10a, 10b, a flow resistance is applied to the liquid.

Figure 3:
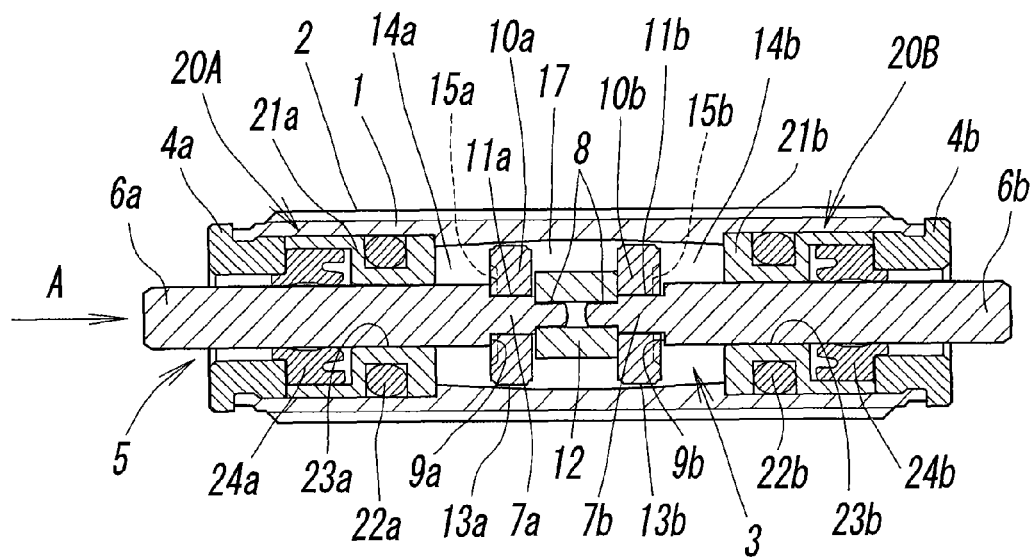
FIG. 3 is a vertical sectional view which shows a state in which a connecting rod of the first embodiment is pushed in an arrow A direction.

Since there are the flow path gaps 13a, 13b, when the moving object collides with the first rod member 6a in an arrow A direction in a state in which the first rod member 6a extends from the cylinder housing 1 as shown in FIG. 1 and the first rod member 6a is pushed into the liquid chamber 3 as shown in FIGS. 3 and 4, the liquid in the second piston chamber 14b is pressurized by the second piston 10b which is located on the front side in the movement direction of the rod 5 and flows into the liquid storage chamber 17 through the flow path gap 13b around the second piston 10b with the flow resistance being applied. On the other hand, when the moving object collides with the second rod member 6b in a state in which the second rod member 6b extends from the cylinder housing 1 and the second rod member 6b is pushed into the liquid chamber 3, the liquid in the first piston chamber 14a is pressurized by the first piston 10a which is located on the front side in the movement direction of the rod 5 and flows into the liquid storage chamber 17 through the flow path gap 13a around the first piston 10a with the flow resistance being applied.

In order to reduce the impact of the moving object to the rod members 6a, 6b at the initial collision, it is desirable to decrease the flow resistance in the flow path gaps 13a, 13b at the initial collision, that is, to ensure the relatively large flow path gaps 13a, 13b. On the other hand, in a case where a kinetic energy of the moving object needs to be substantially absorbed, the flow path gaps 13a, 13b need to be narrowed.

Accordingly, it is desirable that the size of flow path gaps 13a, 13b varies depending on the positions of the pistons 10a, 10b by adjusting the shape of the inner peripheral surface of the piston chambers 14a, 14b. For example, the inner peripheral surface of the piston chamber may be a tapered or similar curved surface so that the flow path gaps 13a, 13b at positions where the pistons 10a, 10b are located at the initial collision of the moving object are large and then gradually become small, or alternatively, in the case where a kinetic energy to be absorbed is not large such as in a retracting motion of the reciprocating moving object, the inner peripheral surface of the piston chamber are formed in a generally cylindrical shape to provide a uniform flow path gaps 13a, 13b. Usually, the kinetic energy to be absorbed to stop the moving object in a shock-absorbing manner is different during advancing motion and retracting motion of the moving object. Accordingly, adjustment of the shape of the inner peripheral surface of the piston chambers 14a, 14b to appropriately define the flow path gaps 13a, 13b may vary according to the kinetic energy of the advancing moving object and retracting moving object in the respective piston chambers 14a, 14b. Further, the flow path gaps 13a, 13b are not limited to the above examples and may be formed as appropriate.

As an example of adjustment of the shape of the inner peripheral surface of the piston chambers 14a, 14b, the illustrated embodiment shows that the inner diameter of the liquid chamber 3 is maximum at a position between the first piston chamber 14a and the second piston chamber 14b and gradually decreases toward the first piston chamber 14a and the second piston chamber 14b. In this case, although the inner diameter of the liquid chamber 3 changes in a curve, the inner diameter may change in a straight line. Further, the rate of change in the inner diameter of the liquid chamber 3 may be different in each of the piston chambers 14a, 14b. Alternatively, the inner diameter of the liquid chamber 3 may be uniform across the entire length.

Further, a first unidirectional flow path 18a is formed between the first piston 10a and a portion of the rod 5 which holds the first piston 10a so that the liquid is prevented from flowing from the first piston chamber 14a to the liquid storage chamber 17 when the first piston 10a moves into the first piston chamber 14a and the liquid is allowed to flow from the liquid storage chamber 17 to the first piston chamber 14a when the first piston 10a moves in the opposite direction. On the other hand, a second unidirectional flow path 18b is formed between the second piston 10b and a portion of the rod 5 which holds the second piston 10b so that the liquid is prevented from flowing from the second piston chamber 14b to the liquid storage chamber 17 when the second piston 10b moves into the second piston chamber 14b and the liquid is allowed to flow from the liquid storage chamber 17 to the second piston chamber 14b when the second piston 10b moves in the opposite direction.

Communication paths 11a, 11b are formed between the outer periphery of the piston mounting sections 7a, 7b of the rod members 6a, 6b and the inner periphery of the center holes of the pistons 10a, 10b so that areas on the front side of the piston (in the piston chambers 14a, 14b) communicate with areas on the back side of the piston (in the liquid storage chamber 17). As shown clearly in FIGS. 2 and 4, communication grooves 15a, 15b are formed to extend in a radius direction of the pistons 10a, 10b on the side face on the front side of the pistons 10a, 10b, so that, when the pistons 10a, 10b abut step sections 9a, 9b on one end of the piston mounting sections 7a, 7b of the rod members 6a, 6b, the communication grooves 15a, 15b allow one end of the communication paths 11a, 11b to communicate with the surrounding spaces of the rod member 6a, 6b (piston chambers 14a, 14b). Further, opening/closing paths 19a, 19b are formed between abutment surfaces 12a, 12b which are flat end faces of the intermediate member 12 and the flat side surface of the pistons 10a, 10b and are opened and closed by the pistons 10a, 10b being in contact with and away from the abutment surfaces 12a, 12b so that the opening/closing paths 19a, 19b allow the other end of the communication paths 11a, 11b to communicate with the liquid storage chamber 17. The opening/closing paths 19a, 19b and the communication paths 11a, 11b form unidirectional flow paths 18a, 18b.

The length of the piston mounting sections 7a, 7b of the rod members 6a, 6b in the axial line L direction is slightly larger than the thickness of the pistons 10a, 10b and the opening/closing paths 19a, 19b are formed by the dimensional difference. For example, as shown in FIGS. 3 and 4, when the first rod member 6a is pressed in the arrow A direction and the first piston 10a is moved away from the abutment surface 12a of the intermediate member 12, the opening/closing path 19a is opened and the communication path 11a of the first rod member 6a communicates with the liquid storage chamber 17. Accordingly, the liquid in the liquid storage chamber 17 is allowed to flow into the piston chamber 14a via the opening/closing path 19a through the communication path 11a and the communication groove 15a, that is, through the first unidirectional flow path 18a. Therefore, the dimensional difference may be of a size that ensures smooth flow of the liquid through the opening/closing path 19a. On the other hand, as shown in FIG. 3, when the first rod member 6a is pressed and the second piston 10b abuts the abutment surface 12b of the intermediate member 12, the opening/closing path 19b is closed and the communication path 11b of the second rod member 6b is blocked from the liquid storage chamber 17. Accordingly, the liquid is not allowed to flow into the liquid storage chamber 17 from the piston chamber 14b through the communication path 11b, that is, through the second unidirectional flow path 18b.

As described above, in the state in which the pistons 10a, 10b are slidably held between the rod members 6a, 6b and the intermediate member 12, when the moving object collides with the first rod member 6a and causes the first rod member 6a to be pushed into the liquid chamber 3 as shown in FIGS. 3 and 4, the liquid in the second piston chamber 14b is pressurized by the second piston 10b which is located on the front side in the movement direction of the rod 5. Accordingly, the second piston 10b comes into press contact with the abutment surface 12b of the intermediate member 12 and closes the opening/closing path 19b, thereby blocking one end of the communication path 11b from the liquid storage chamber 17. As a result, the liquid in the second piston chamber 14b is allowed to flow into the liquid storage chamber 17 through only the flow path gap 13b around the second piston 10b with the flow resistance being applied, and at this time, a braking force is generated. Then, the liquid flowed into the liquid storage chamber 17 acts on the first piston 10a on the back side in the movement direction of the rod 5 to push it to the back side in the movement direction of the rod 5. Accordingly, the first piston 10a moves away from the abutment surface 12a of the intermediate member 12 and opens the opening/closing path 19a, and the communication path 11a communicates with the liquid storage chamber 17. As a result, the liquid in the liquid storage chamber 17 is allowed to flow into the first piston chamber 14a through the communication path 11a.

As a matter of course, when the moving object collides with the second rod 6b and causes the second rod 6b to be pushed into the liquid chamber 3, opposite operations to those described above are performed.

The illustrated configuration of the unidirectional flow paths 18a, 18b is merely an example, and, for example, the communication paths 11a, 11b may be formed as an axial groove formed on the outer surface of the piston mounting sections 7a, 7b of the rod members 6a, 6b or the inner peripheral surface of the pistons 10a, 10b. Although the communication grooves 15a, 15b are formed on the pistons 10a, 10b, the communication grooves 15a, 15b may be formed on the step sections 9a, 9b of the rod members 6a, 6b.

Further, although the unidirectional flow paths 18a, 18b are formed between the pistons 10a, 10b and portions of the rod 5 which hold the pistons 10a, 10b, the unidirectional flow paths 18a, 18b may be of other configuration which works in the same manner as that of the above described unidirectional flow path. For example, an independent check valve may be incorporated in the flow path which communicates the area on the front and back sides of the pistons 10a, 10b, or alternatively, an independent check valve may be incorporated in the rod members 6a, 6b. In such a case, the pistons 10a, 10b are not necessarily held movable to the rod 5 in the axis direction, and the piston 10a, 10b may be fixedly provided to the rod 5.

Further, the seal mechanisms 20A, 20B are disposed on the inner side of the covers 4a, 4b which is fixed to the both ends of the cylinder housing 1 by caulking the ends of the cylinder housing 1 so as to seal both ends of the cylinder housing 1. The seal mechanisms 20A, 20B are provided with holding members 21a, 21b that are fixedly fitted on the inner side of the covers 4a, 4b, and seal members 22a, 22b formed of an o-ring are fitted on an annular groove on the outer peripheral surface of the holding member 21a, 21b so that the seal members 22a, 22b seal between the outer peripheral surface of the holding members 21a, 21b and the inner peripheral surface of the cylinder housing 1.

Further, rod receiving holes 23a, 23b are formed in a half portion of the holding members 21a, 21b located on the side of the pistons 10a, 10b so that the rod members 6a, 6b slidably penetrate therethrough and the holding members 21a, 21b serve as a bearing and a guide for the rod members 6a, 6b. Further, spaces are formed on the inner periphery of a half portion of the holding members 21a, 21b located on the side of the covers 4a, 4b so that portions of the seal members 24a, 24b which are in contact with the outer peripheral surface of the rod members 6a, 6b are housed therein, and the seal members 24a, 24b seal between the inner periphery of the holding members 21a, 21b and the outer periphery of the rod members 6a, 6b, thereby preventing leakage of the liquid such as oil filled in the liquid chamber 3.

The double-rod type shock absorber of the first embodiment having the above configuration includes the rod 5 which penetrates a single liquid chamber 3 and holds a pair of shock-absorbing pistons 10a, 10b so as to be movable to the rod 5 in the axial line L direction, and is configured such that, when the moving object collides with one end and the other end of the rod 5 in an alternative manner and the rod moves, the liquid in the piston chambers 14a, 14b pressurized by one of the pistons 10a, 10b flows into the central liquid storage chamber 17 through the flow path gaps 13a, 13b around the pressurizing pistons 10a, 10b, and flows out of the liquid storage chamber 17 into the piston chambers 14b, 14a defined by the other of the pistons 10b, 10a through the unidirectional flow paths 18b, 18a on the other of the pistons 10b, 10a. When the rod 5 moves in one direction by collision of the moving object and stops at a movement end in a shock-absorbing manner, the other end of the rod 5 is pushed back to a return position extending from the other end of the cylinder housing 1 while the liquid which is pressurized by the pistons 10a, 10b for braking flows in the liquid chamber 3 in a direction opposite to the movement direction of the rod 5 and is ready for a next collision by the moving object to the other end of the rod 5.

Accordingly, the foregoing double-rod type hydraulic shock absorber can stably perform a shock-absorbing function to a reciprocating motion of the moving object in either direction and has a simple configuration and reduced cost since the number of parts is small.

According to the above description, the foregoing shock absorber is described that, when the moving object collides one of a pair of rod members 6a, 6b and the rod 5 moves and then stops in a shock-absorbing manner, the other of the rod members 6b, 6a is pushed back to an appropriate return position on the other end of the cylinder housing 1 and is ready for a next collision by the moving object to the other of the rod members. However, the invention may be applied when the moving object does not collide with the other of the rod member. In such a case, for example, a sensor that detects the other of the rod members reaches the return position is provided, and push-back means for rod members, such as a spring and any other means, that operates based on the output of the sensor may be separately provided.

Further, each time the moving object collides with the rod members 6a, 6b on both ends of the cylinder housing 1, a simple operation in which a substantial part of the liquid in the one of the piston chambers flows into the other of the piston chambers is repeated. This is similar to the conventional flow of liquid in the hydraulic shock absorber having the rod extending from only one end of the cylinder housing 1, and accordingly, a technique of the shock absorber having a known single rod can be fully utilized and components of the shock absorber can be used in common.

The liquid storage chamber 17 between the pair of pistons 10a, 10b in the cylinder housing 1 is configured such that, when the moving object collides with one of the pair of rod members 6a, 6b and the pistons 10b, 10a are moved to the piston chambers 14b, 14a, the liquid flows out from the piston chambers 14b, 14a into the other of piston chamber 14a, 14b through the liquid storage chamber 17. Since the liquid storage chamber 17 itself is merely a space which allows the liquid to pass through, it is possible to reduce the size of the cylinder housing 1 by reducing the length in the axis direction as possible, or ultimately by reducing the length to the extent that the above functions are not impaired, thereby achieving size reduction of the shock absorber. Nevertheless, the liquid storage chamber 17 can also be effectively used as an accumulator to extend the life of the shock absorber by housing the liquid in a pressurized state in the liquid chamber 3 as shown in the embodiment of FIGS. 5 and 6.

Figure 5:
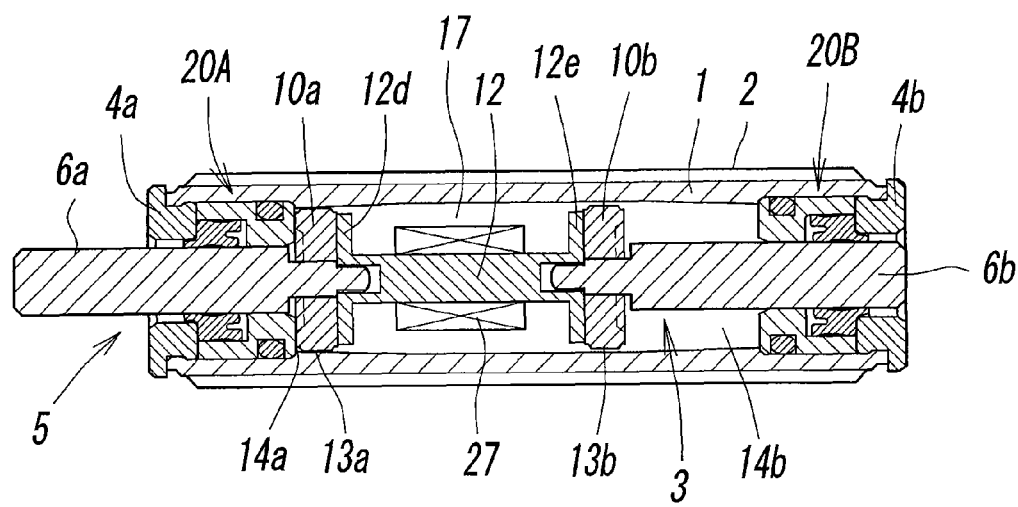
FIG. 5 is a vertical sectional view which shows a configuration of a second embodiment of the double-rod type shock absorber according to the present invention.

In the second embodiment shown in FIG. 5, the intermediate member 12 between a pair of pistons 10a, 10b which are held on the rod 5 is a connection member for the rod members 6a, 6b similar to the case of the first embodiment. Further, flanges 12d, 12e are provided on both ends of the intermediate member 12 to define the liquid storage chamber 17 which is formed around the intermediate member 12, and an annular elastic member 27 made of a synthetic resin foam having closed cells which is expandable and contractible is placed in the liquid in the liquid storage chamber 17. The liquid storage chamber 17 is formed relatively large, and the liquid which is pressurized so that the elastic member 27 is compressed is housed in the liquid chamber 3 which includes the liquid storage chamber 17, thereby forming an accumulator. Accordingly, even if the liquid in the liquid chamber 3 may be leaked from around the rod members 6a, 6b or the like during long time of use, a function as a shock absorber is prevented from being reduced and a life of the shock absorber can be increased.

Figure 6:
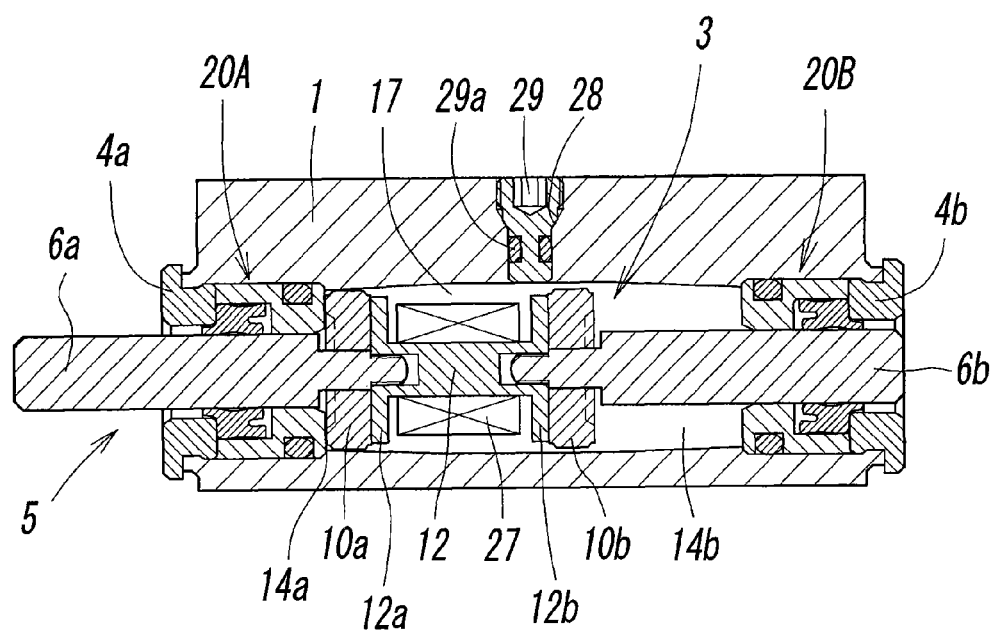
FIG. 6 is a vertical sectional view which shows a configuration of a third embodiment of the double-rod type shock absorber according to the present invention.

Further, in the third embodiment shown in FIG. 6, the annular elastic member 27 is housed in the liquid storage chamber 17 which is formed around the intermediate member 12 as similar to the second embodiment. Further, a filling hole 28 for the liquid is formed such that the liquid storage chamber 17 is opened to the outside through the filling hole 28 and the filling hole 28 is closed by the pressure adjusting plug 29 which applies pressure to the liquid in the liquid chamber 3. The filling hole 28 for the liquid formed on the wall of the cylinder housing 1 needs to be always opened to the liquid chamber 3 without being closed by a part of the rod 5, regardless of positions of the rod 5. Further, the filling hole 28 includes a cylindrical section which is closed by an o-ring 29a of a pressure adjusting plug 29, and the liquid in the liquid chamber 3 can be pressurized by injecting the liquid which fills the cylindrical section of the filling hole 28 by the o-ring 29a of the pressure adjusting plug 29 which is threaded into the filling hole 28.

Further, FIGS. 5 and 6 shows that one rod member 6a extends from the cylinder housing 1 and is ready for a collision by the moving object to the rod member 6a as similar to FIG. 1. Since the configuration and operation of the second and third embodiments described with reference to FIGS. 5 and 6 is the substantially same as those of the first embodiment described with reference to FIGS. 1 to 4, the same or similar main elements in those figures are denoted by the same references and the description therefor is omitted.

Although the rod 5 is shown as being formed of the pair of rod member 6a, 6b mechanically connected to each other by the intermediate member 12 in the first to third embodiments, they may be integrally connected to form the rod 5. In this case, an element that corresponds to the intermediate member 12 formed in a cylindrical shape interposed between the pair of pistons 10a, 10b which are movable in the axis direction of the liquid chamber 3 or having the flanges 12d, 12e on each end may be provided on the rod 5 as an integral or separate element.

REFERENCE SIGNS LIST 1 cylinder housing
3 liquid chamber
4a, 4b cover
5 rod
6a, 6b rod member
7a, 7b piston mounting section
9a, 9b step section
10a, 10b piston
11a, 11b communication path
12 intermediate member
12a, 12b abutment surface
13a, 13b flow path gap
14a, 14b piston chamber
15a, 15b communication groove
17 liquid storage chamber 17
18a, 18b unidirectional flow path
19a, 19b opening/closing path
27 elastic member
28 filling hole
29 pressure adjusting plug

The invention claimed is:

1. A double-rod type shock absorber comprising:
a cylinder housing in which a liquid chamber filled with a liquid is formed; a series of rods that penetrates the cylinder housing in an axis direction with one end and the other end extending to an outside from one end and the other of the cylinder housing in a liquid-tight manner and reciprocates in the axis direction; first and second pistons that are held with a space interposed therebetween in the axis direction at a position in the liquid chamber of the rod and are individually disposed to be displaceable in the axis direction on the rod by an action of fluid pressure; first and second piston chambers that are defined by the first and second pistons on one end and the other end of the liquid chamber; a liquid storage chamber that is formed between the first piston and the second piston; a flow path gap that is formed between an outer peripheral surface of the first and second pistons and an inner peripheral surface of the liquid chamber so that a flow resistance is applied to the liquid; and first and second unidirectional flow paths which are openable/closable and connect the first and second piston chambers with the liquid storage chamber,
wherein the first and second unidirectional flow paths are openable/closable by a displacement of the first and second pistons with respect to the rod and are configured such that, during reciprocating motion of the rod, the unidirectional flow path located on a front side in a movement direction of the rod is closed by the displacement of the piston located on the front side in a movement direction with respect to the rod so as not to allow the liquid to flow from the piston chamber located on the front side in the movement direction to the liquid storage chamber, and the unidirectional flow path located on a back side in the movement direction of the rod is opened by the displacement of the piston located on the back side in the movement direction with respect to the rod so as to allow the liquid to flow from the liquid storage chamber to the piston chamber located on the back side in the movement direction.

2. The double-rod type shock absorber according to claim 1, wherein the rod includes a first rod member that extends from one end of the cylinder housing, a second rod member that extends from the other end of the cylinder housing, and an intermediate member that connects the first rod member and the second rod member in the liquid chamber,
the first and second pistons are disposed to be displaceable in the axis direction piston mounting sections which are formed on the first and second rod members at positions adjacent to the intermediate member and are displaced by reciprocating motion of the rod into contact with and away from the first and second abutment surfaces on one end and the other end of the intermediate member in an alternative manner, and
the first and second unidirectional flow paths each include a communication path formed between an inner peripheral surface of the first and second pistons and an outer peripheral surface of the piston mounting sections so as to be normally in communication with the first and second piston chambers and an opening/closing path formed between the first and second abutment surfaces of the intermediate member and a side face of the first and second pistons so as to allow or block communication between the communication path and the liquid storage chamber, and the opening/closing path is configured to be opened/closed by the first and second pistons which come into contact with and move away from the first and second abutment surfaces.

3. The double-rod type shock absorber according to claim 2, wherein a communication groove is formed between the side face of the first and second pistons which faces to the first and second piston chambers and a step section for the pistons which come into contact with and move away from the step section disposed on an end of the piston mounting sections so that the communication path is normally in communication with the first and second piston chambers.

4. The double-rod type shock absorber according to claim 1, wherein an inner diameter of the liquid chamber is maximum at a position between the first piston chamber and the second piston chamber and gradually decreases toward the first piston chamber and the second piston chamber.

5. The double-rod type shock absorber according to claim 4, wherein the inner diameter of the liquid chamber varies on the first piston chamber side and the second piston chamber side.

6. The double-rod type shock absorber according to claim 2, wherein a portion of the first and second rod members which reciprocates in the liquid chamber, the intermediate member, the first and second pistons and the first and second unidirectional flow paths are symmetry with respect to a center of the intermediate member in the axis direction.

7. The double-rod type shock absorber according to claim 1, wherein an elastic member formed of an expandable and contractible foam having closed cells is housed in the liquid storage chamber so as to form an accumulator by applying pressure to the liquid and compressing the elastic member.

8. The double-rod type shock absorber according to claim 7, wherein a filling hole for filling the liquid is formed at a center of the liquid chamber in the cylinder housing, and the filling hole is closed by a pressure adjusting plug which applies pressure to the liquid.

9. The double-rod type shock absorber according to claim 2, wherein an inner diameter of the liquid chamber is maximum at a position between the first piston chamber and the second piston chamber and gradually decreases toward the first piston chamber and the second piston chamber.

10. The double-rod type shock absorber according to claim 3, wherein an inner diameter of the liquid chamber is maximum at a position between the first piston chamber and the second piston chamber and gradually decreases toward the first piston chamber and the second piston chamber.

11. The double-rod type shock absorber according to claim 9, wherein the inner diameter of the liquid chamber varies on the first piston chamber side and the second piston chamber side.

12. The double-rod type shock absorber according to claim 10, wherein the inner diameter of the liquid chamber varies on the first piston chamber side and the second piston chamber side.

13. The double-rod type shock absorber according to claim 3, wherein a portion of the first and second rod members which reciprocates in the liquid chamber, the intermediate member, the first and second pistons and the first and second unidirectional flow paths are symmetry with respect to a center of the intermediate member in the axis direction.

* * * * *